(12) United States Patent
Takase et al.

(10) Patent No.: US 7,376,328 B2
(45) Date of Patent: May 20, 2008

(54) PHOTOSENSITIVE RESIN COMPOSITION FOR OPTICAL WAVEGUIDE FORMATION AND OPTICAL WAVEGUIDE

(75) Inventors: Hideaki Takase, Tokyo (JP); Yuuichi Eriyama, Tokyo (JP)

(73) Assignee: JSR Corporation, Tokyo (JP)

( * ) Notice: Subject to any disclaimer, the term of this patent is extended or adjusted under 35 U.S.C. 154(b) by 311 days.

(21) Appl. No.: 10/527,547

(22) PCT Filed: Sep. 30, 2003

(86) PCT No.: PCT/JP03/12479

§ 371 (c)(1),
(2), (4) Date: Mar. 11, 2005

(87) PCT Pub. No.: WO2004/031251

PCT Pub. Date: Apr. 15, 2004

(65) Prior Publication Data

US 2006/0008222 A1    Jan. 12, 2006

(30) Foreign Application Priority Data

| Oct. 7, 2002 | (JP) | ............................ 2002-294148 |
| Jan. 15, 2003 | (JP) | ............................ 2003-007477 |
| Mar. 12, 2003 | (JP) | ............................ 2003-067039 |
| Jun. 20, 2003 | (JP) | ............................ 2003-175696 |

(51) Int. Cl.
- *G02B 6/12* (2006.01)
- *G02B 6/00* (2006.01)
- *C08F 2/46* (2006.01)
- *C08F 220/22* (2006.01)

(52) U.S. Cl. .................. 385/143; 385/145; 522/103; 522/167

(58) Field of Classification Search ............... 522/103, 522/181, 167; 385/143, 145
See application file for complete search history.

(56) References Cited

U.S. PATENT DOCUMENTS

| 4,902,440 | A | * | 2/1990 | Takeyama et al. ...... 252/182.18 |
| 4,959,431 | A | * | 9/1990 | Watanabe et al. ........... 526/261 |
| 5,263,111 | A | * | 11/1993 | Nurse et al. ................ 385/130 |
| 5,616,630 | A |   | 4/1997 | Heinze |
| 2002/0183411 | A1 | * | 12/2002 | Ohba et al. .................... 522/35 |

FOREIGN PATENT DOCUMENTS

| DE | 40 10 784 A1 | 10/1991 |
| EP | 0 346 486 A1 | 12/1989 |
| EP | 0 601 203 A1 | 6/1994 |
| JP | 60-202110 | 10/1985 |
| JP | 1-299807 | 12/1989 |
| JP | 3-31309 | 2/1991 |
| JP | 5-119203 | 5/1993 |
| JP | 06-273631 | 9/1994 |
| JP | 2000-66051 | 3/2000 |

* cited by examiner

*Primary Examiner*—Susan W Berman
(74) *Attorney, Agent, or Firm*—Oblon, Spivak, McClelland, Maier & Neustadt, P.C.

(57) ABSTRACT

A photosensitive resin composition for optical waveguide formation, comprising:

(A) a di(meth)acrylate having the structure represented by the following general formula (1):

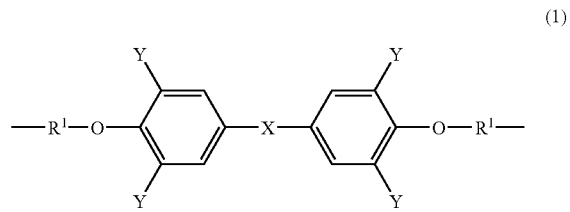

(1)

(wherein $R^1$ is —$(OCH_2CH_2)_m$—, —$(OCH(CH_3)CH_2)_m$—, or —$OCH_2CH(OH)CH_2$—; X is —$C(CH_3)_2$—, —$CH_2$—, —O—, or —$SO_2$—; Y is a hydrogen atom or a halogen atom; m is an integer of 0 to 4);

(B) a mono(meth)acrylate having the structure represented by the following general formula (2):

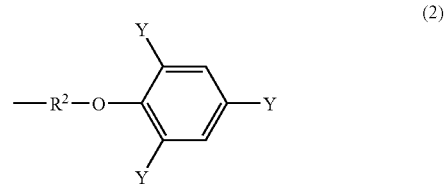

(2)

(wherein $R^2$ is —$(OCH_2CH_2)_p$—, —$(OCH(CH_3)CH_2)_p$—, or —$OCH_2CH(OH)CH_2$—; Y is a hydrogen atom, a halogen atom, Ph-$C(CH_3)_2$—, Ph-, or an alkyl group having 1 to 20 carbon atoms; p is an integer of 0 to 4; Ph is a phenyl group); and (C) a photoradical polymerization initiator. The composition has excellent patterning ability, refractive index, heat resistance, and transmission characteristic.

18 Claims, No Drawings

PHOTOSENSITIVE RESIN COMPOSITION FOR OPTICAL WAVEGUIDE FORMATION AND OPTICAL WAVEGUIDE

TECHNICAL FIELD

The present invention relates to a photosensitive resin composition for optical waveguide formation which is used for fabricating optical circuits used in the fields of optical communications and optical information processing, and also relates to an optical waveguide fabricated by using the aforementioned composition.

BACKGROUND ART

Because the multimedia époque has created a demand for increased volume and speed of information processing in optical communication systems and computers, transmission systems using light as a transmission medium have been finding application in public communication networks, LAN (local area networks), FA (factory automation), interconnectors between computers, household internal wiring, and the like. Among the elements constituting the transmission systems, optical waveguides are the basic structural elements, for example, in optical devices for realizing high-volume information transmission of movies and dynamic images, optical computers, optoelectronic integrated circuits (OEIC), and optical integrated circuits (optical IC). Optical waveguides have been actively studied because of a large demand for them. Especially, high-performance and low-cost products are especially required.

Quartz optical waveguides and polymer optical waveguides are known as optical waveguides.

Among them, quartz optical waveguides have an advantage of a low transmission loss. However, quartz optical waveguides have disadvantages of causing process-related problems which include a high temperature required in the processing of the manufacturing step, and difficulties encountered in the production of optical waveguides having large surface areas.

Further, the advantages of polymer optical waveguides include easiness of processing and a large degree of freedom in material design. For this reason, the use of polymer materials such as poly(methyl methacrylate), polycarbonate and the like have been studied. However, polymer optical waveguides usually have poor heat resistance. For this reason, fluorinated polyimides that have excellent heat resistance and transmission loss have been widely researched in recent years.

However, when polymer materials are used, it takes a lot of time to produce polymer optical waveguides, because dry etching is required for forming core portions of polymer optical waveguides as required similarly in the production of quarts optical waveguides.

Under these circumstances, photocurable materials such as epoxy UV-curable resins having photolithographic capability, and optical waveguides using such photocurable materials have been recently suggested (for example, see claim 1 of Japanese Patent Application Laid-open (JP-A) No. H6-273631).

As described above, the problems associated with the conventional polymer optical waveguides are that the waveguide loss in the region of a wavelength of 650-1600 nm is comparatively high, heat resistance is poor, and some of the characteristics required for the optical waveguides are unsatisfactory.

In order to resolve these problems, chemical treatment methods of the polymer such as fluorination or deuteration substitution have been studied. When such chemical treatment methods are used, adhesion to the substrate degrades, and long-term reliability deteriorates. Also, when the chemically treated polymer is used for the core portion, the refractive index may not be increased to the desired level.

DISCLOSURE OF THE INVENTION

The present invention has been created to resolve the above-described problems, and an object of the present invention is to provide a resin composition for an optical waveguide which has excellent physical properties such as waveguide loss, refractive index and heat resistance, and an optical waveguide composed of the cured product of such a composition.

The inventors have conducted a comprehensive study to resolve the above-described problems and have found that a photosensitive resin composition, which comprises a photoradical polymerization initiator and two different (meth)acrylates having aromatic rings, is perfectly suitable as a resin for forming an optical waveguide. This finding led to the creation of the present invention.

Thus, the present invention provides a photosensitive resin composition for optical waveguide formation, comprising:

(A) a di(meth)acrylate having the structure represented by the following general formula (1):

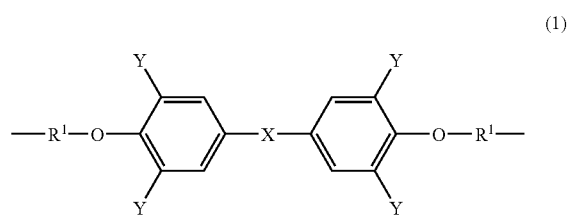

(1)

(wherein $R^1$ is $-(OCH_2CH_2)_m-$, $-(OCH(CH_3)CH_2)_m-$, or $-OCH_2CH(OH)CH_2-$; X is $-C(CH_3)_2-$, $-CH_2-$, $-O-$, or $-SO_2-$; Y is a hydrogen atom or a halogen atom; m is an integer of 0 to 4);

(B) a mono(meth)acrylate having the structure represented by the following general formula (2):

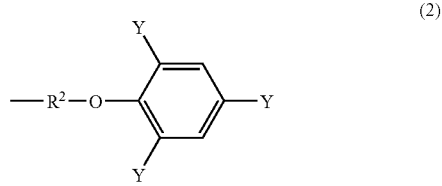

(2)

(wherein $R^2$ is $-(OCH_2CH_2)_p-$, $-(OCH(CH_3)CH_2)_p-$, or $-OCH_2CH(OH)CH_2-$; Y is a hydrogen atom, a halogen atom, $Ph-C(CH_3)_2-$, $Ph-$, or an alkyl group having 1 to 20 carbon atoms; p is an integer of 0 to 4; Ph is a phenyl group); and (C) a photoradical polymerization initiator.

The photosensitive resin composition for optical waveguide formation having such a structure has excellent patterning ability during curing, and demonstrates physical properties such as a high refractive index, high heat resistance, and excellent transmission characteristic (i.e. low waveguide loss) when an optical waveguide is formed. The photosensitive resin composition can be preferably used as a material for forming a core layer and the like of an optical waveguide.

The resin composition of the present invention can be so composed that the weight ratio (A/B) of the component (A) to the component (B) is, for example, 0.3 to 5.0.

Setting this weight ratio within this numerical range improves physical properties such as heat resistance and the like to an even better degree.

The resin composition of the present invention can be so constituted that total amount of the component (A) and the component (B) in the composition is 30 wt. % or higher.

Setting this amount within this numerical range improves physical properties such as refractive index, waveguide loss and the like to an even better degree.

The resin composition of the present invention can comprises a (meth)acrylate having 3 or more (meth)acryloyl groups in a molecule.

Using such a component makes it possible to improve heat resistance and the like to an even higher degree.

The resin composition of the present invention makes it possible to obtain a cured product having a refractive index of 1.54 or higher at 25° C. and 824 nm.

The resin composition of the present invention makes it possible to obtain a cured product having a glass transition temperature (Tg) of 80° C. or higher.

Further, the present invention provides an optical waveguide which comprises a core layer, and a clad layer formed by lamination on the core layer, wherein the core layer and/or the clad layer is composed of the cured product of the aforementioned resin composition.

The optical waveguide having the above-described structure has physical properties such as a high refractive index, high heat resistance, excellent patterning ability, and low waveguide loss.

Further, the present invention also provides a method for manufacturing an optical waveguide, which comprises a step of irradiating the aforementioned resin composition with radiation via a photomask and curing the resin composition.

BEST MODE FOR CARRYING OUT THE INVENTION

The present invention will be described below in greater detail.

The resin composition of the present invention comprises the below-explained components (A)-(C) as the constituent components.

In the present specification, the concept of the resin composition of the present invention includes both the liquid form prior to curing, which comprises the components (A) to (C), and the form obtained by curing the liquid composition comprising the components (A) to (C).

The component (A) constituting the resin composition of the present invention is a di(meth)acrylate having the structure represented by the following general formula (1):

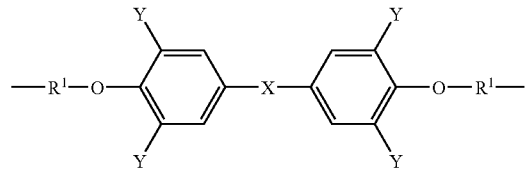

(wherein $R^1$ is —$(OCH_2CH_2)_m$—, —$(OCH(CH_3)CH_2)_m$—, or —$OCH_2CH(OH)CH_2$—; X is —$C(CH_3)_2$—, —$CH_2$—, —O—, or —$SO_2$—; Y is a hydrogen atom or a halogen atom; m is an integer of 0 to 4).

In the formula (1), examples of the halogen atom represented by Y include chlorine, bromine, iodine, and fluorine. Among them, bromine is preferred.

Examples of the component (A) include ethylene oxide-added bisphenol A (meth)acrylic acid ester, ethylene oxide-added tetrabromobisphenol A (meth)acrylic acid ester, propylene oxide-added bisphenol A (meth)acrylic acid ester, propylene oxide-added tetrabromobisphenol A (meth) acrylic acid ester, bisphenol A epoxy (meth)acrylate obtained by the epoxy ring opening reaction of bisphenol A diglycidyl ether and (meth)acrylic acid, tetrabromobisphenol A epoxy (meth)acrylate obtained by the epoxy ring opening reaction of tetrabromobisphenol A diglycidyl ether and (meth)acrylic acid, bisphenol F epoxy (meth)acrylate obtained by the epoxy ring opening reaction of bisphenol F diglycidyl ether and (meth)acrylic acid, and tetrabromobisphenol F epoxy (meth)acrylate obtained by the epoxy ring opening reaction of tetrabromobisphenol F diglycidyl ether and (meth)acrylic acid.

Among them, ethylene oxide-added bisphenol A (meth) acrylic acid ester, ethylene oxide-added tetrabromobisphenol A (meth)acrylic acid ester, bisphenol A epoxy (meth) acrylate obtained by the epoxy ring opening reaction of bisphenol A diglycidyl ether and (meth)acrylic acid, and tetrabromobisphenol A epoxy (meth)acrylate are especially preferred.

Examples of commercial products of the component (A) include Biscoat #700, #540 (manufactured by Osaka Yuki Kagaku Kogyo K. K.), Aronix M-208, M-210 (manufactured by To a Gosei K. K.), NK Ester BPE-100, BPE-200, BPE-500, and A-BPE-4 (manufactured by Shin Nakamura Kagaku K. K.), Light Ester BP-4EA, BP-4PA, Epoxy Ester 3002M, 3002A, 3000M, 3000A (manufactured by Kyoeisha Kagaku K. K.), KAYARAD R-551, R-712 (manufactured by Nippon Kayaku K. K.), BPE-4, BPE-10, BR-42M (manufactured by Daiichi Kogyo Seiyaku K.K.), Ripoxy VR-77, VR-60, VR-90, SP-1506, SP-1506, SP-1507, SP1509, and SP-1563 (manufactured by Showa Kobunshi K. K.), and Neopol V779, Neopol V779MA (manufactured by Nippon Yupika K. K.).

The component (B) constituting the resin composition of the present invention is a (meth)acrylate having the structure represented by the following formula (2).

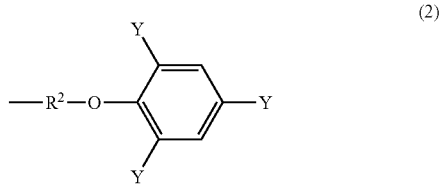

(2)

(wherein $R^2$ is $-(OCH_2CH_2)_p-$, $-(OCH(CH_3)CH_2)_p-$, or $-OCH_2CH(OH)CH_2-$; Y is a hydrogen atom, a halogen atom, Ph-C(CH$_3$)$_2$-, Ph-, or an alkyl group having 1 to 20 carbon atoms; p is an integer of 0 to 4; Ph is a phenyl group).

In the formula (2), examples of the halogen atom represented by Y include chlorine, bromine, iodine, and fluorine. Among them, bromine is preferred.

Examples of the component (B) include phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 2-hydroxy-3-phenoxypropyl (meth)acrylate, p-cumyl phenol ethylene oxide modified (meth)acrylate, 2-bromophenoxyethyl (meth)acrylate, 4-bromophenoxyethyl (meth)acrylate, 2,4-dibromophenoxyethyl (meth)acrylate, 2,6-dibromophenoxyethyl (meth)acrylate, and 2,4,6-tribromophenoxyethyl (meth)acrylate.

Among them, phenoxyethyl (meth)acrylate, phenoxyethoxyethyl (meth)acrylate, (meth)acrylate of p-cumyl phenol reacted with ethylene oxide, and 2,4,6-tribromophenoxyethyl (meth)acrylate are especially preferred.

Examples of commercial products of the component (B) include Aronix M113, M110, M101, M102, M5700, and TO-1317 (manufactured by To a Gosei K. K.), Biscoat #192, #193, #220, 3BM (manufactured by Osaka Yuki Kagaku Kogyo K. K.), NK Ester AMP-10G, AMP-20G (manufactured by Shin-Nakamura Kagaku K. K.), Light Acrylate PO-A, P-200A, Epoxy Ester M-600A (manufactured by Kyoeisha Kagaku K. K.), and PHE, CEA, PHE-2, BR-30, BR-31, BR-31M, BR-32 (manufactured by Daiichi Kogyo Seiyaku K. K.).

The total amount of the components (A) and (B) in the resin composition of the present invention is preferably 30 wt. % or higher, more preferably 40 wt. % or higher, and especially preferably 50 wt. % or higher. If the amount is 30 wt. % or higher, when the resin composition of the present invention is used for the core portion of an optical waveguide, a higher refractive index and a lower waveguide loss can be obtained.

The weight ratio (A/B) of the component (A) to the component (B) in the resin composition of the present invention is preferably 0.3 to 5.0, more preferably 0.4 to 4. If this weight ratio is 0.3 or higher, the glass transition temperature of the cured product is increased and heat resistance is improved. Moreover, the core layer can be more reliably formed to the desired shape. Further, if the weight ratio is 5.0 or less, the patterning ability can be improved.

When the core layer of an optical waveguide is fabricated by using the resin composition of the present invention, from the standpoint of patterning ability, the components (A) and (B) are preferably acrylates rather than methacrylates.

The component (C) constituting the resin composition of the present invention is a photoradical polymerization initiator. Examples of the component (C) include acetophenone, acetophenone benzylketal, 1-hydroxycyclohexyl phenyl ketone, 2-benzyl-2-dimethylamino-1-(4-morpholinophenyl)-butanone-1,2,2-dimethoxy-2-phenylacetophenone, xanthone, fluorenone, benzaldehyde, fluorine, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholinopropane-1-one, 2,4,6-trimethylbenzoyl diphenylphosphine oxide, and bis-(2,6-dimethoxybenzoyl)-2,4,4-trimethylpentyl phosphine oxide.

Examples of commercial products of the component (C) include Irgacure 184, 369, 651, 500, 819, 907, 784, 2959, CGI1700, CGI1750, CGI11850, CG24-61, Darocur 1116, 1173 (manufactured by Ciba Specialty Chemicals Co., Ltd.), Lucirin LR8728 (manufactured by BASF Co.), and Uvecryl P36 (manufactured by UCB Co.).

The component (C) can be used alone, or can be used in combination of two or more thereof to improve the patterning ability.

The weight ratio of the component (C) in the resin composition of the present invention is usually 0.01 to 10 wt. %, preferably 0.1 to 7 wt. %. When the weight ratio is 10 wt. % or less, curing characteristic, transmission characteristic, patterning ability, and handleability can be improved. Furthermore, when the weight ratio is 0.01 wt. % or more, patterning ability and mechanical characteristics of the cured product can be improved, and the decrease in curing rate can be prevented.

In the present invention, a compound having a (meth)acryloyl group or vinyl group (sometimes referred to hereinbelow as "unsaturated monomer" with the proviso that compounds identical to the components (A) and (B) are excluded) can be used as an optional component in addition to the components (A) and (B). Among them, a (meth)acrylate having three or more (meth)acryloyl groups is preferably used.

Examples of the (meth)acrylate having three or more (meth)acryloyl groups include (meth)acrylates of polyhydric alcohols having three or more hydroxyl groups. Examples of such (meth)acrylates include trimethylolpropane tri(meth)acrylate, pentaerythritol tri(meth)acrylate, trimethylolpropane trioxyethyl (meth)acrylate, tris(2-acryloyloxyethyl) isocyanurate, and pentaerythritol polyacrylate. These compounds may be used individually or in combinations of two or more thereof.

Examples of commercial products of the (meth)acrylate having three or more (meth)acryloyl groups include Aronix M305, M309, M310, M315, M320, M350, M360, and M408 (manufactured by To a Gosei K. K.), Biscoat #295, #300, #360, GPT, 3PA, #400 (manufactured by Osaka Yuki Kagaku Kogyo K. K.), NK Ester TMPT, A-TMPT, A-TMM-3, A-TMM-3L, A-TMMT (manufactured by Shin-Nakamura Kagaku K. K.), Light Acrylate TMP-A, TMP-6EO-3A, PE-3A, PE-4A, DPE-6A (manufactured by Kyoeisha Kagaku K. K.), and KAYARAD PET-30, GPO-303, TMPTA, TPA-320, DPHA, D-310, DPCA-20, and DPCA-60 (manufactured by Nippon Kayaku K. K.).

Examples of other unsaturated monomers include vinyl monomers such as N-vinyl pyrrolidone, N-vinyl caprolactam, vinyl imidazole, and vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth) acrylate, 4-butylcyclohexyl (meth)acrylate, acryloyl morpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth) acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth)acrylate, methoxyethylene glycol (meth) acrylate, ethoxyethyl (meth)acrylate, methoxypolyethylene glycol (meth)acrylate, methoxypolypropylene glycol (meth) acrylate, diacetone (meth)acrylamide, isobutoxymethyl (meth)acrylamide, N, N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutylvinyl ether, laurylvinyl ether, cetylvinyl ether, 2-ethylhexylvinyl ether and monofunctional monomers represented by the following formulas (3), (4)

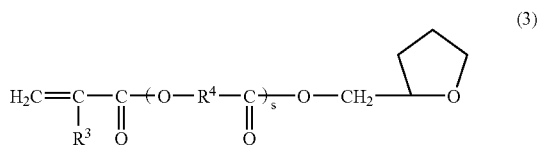

(3)

(wherein $R^3$ is a hydrogen atom or a methyl group; $R^4$ is an alkylene group having 2 to 8 carbon atoms; s is an integer of 1 to 8).

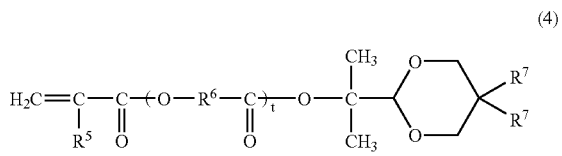

(4)

(wherein each of $R^5$ and $R^7$ is independently a hydrogen atom or a methyl group; $R^6$ is an alkylene group having 2 to 8 carbon atoms; t is an integer of 1 to 8).

Examples of an unsaturated monomer having two (meth) acryloyl groups or vinyl groups include alkyldioldiacrylates such as 1,4-butanedioldiacrylate, 1,6-hexanedioldiacrylate and 1,9-nonanedioldiacrylate, polyalkylene glycol diacrylates such as ethylene glycol di(meth)acrylate, tetraethylene glycol diacrylate, and tripropylene glycol diacrylate, neopentylglycol di(meth)acrylate, and tricyclodecane methanol diacrylate.

Examples of commercial products of those compounds include Aronix M120, M-150, M-156, M-215, M-220, M-225, M-240, M-245, and M-270 (manufactured by To a Gosei K. K.), AIB, TBA, LA, LTA, STA, Biscoat #155, IBXA, Biscoat #158, #190, #150, #320, HEA, HPA, Biscoat #2000, #2100, DMA, Biscoat #195, #230, #260, #215, #335HP, #310HP, #310HG, #312 (manufactured by Osaka Yuki Kagaku Kogyo K. K.), Light Acrylate IAA, L-A, S-A, BO-A, EC-A, MTG-A, DMP-A, THF-A, IB-XA, HOA, HOP-A, HOA-MPL, HOA-MPE, Light Acrylate 3EG-A, 4EG-A, 9EG-A, NP-A, 1,6HX-A, DCP-A (manufactured by Kyoeisha Kagaku K. K.), and KAYARAD, TC-110S, HDDA, NPGDA, TPGDA, PEG400DA, MANDA, HX-220, HX-620 (manufactured by Nippon Kayaku K. K.), FA-511A, 512A, 513A (manufactured by Hitachi Kasei K. K.), VP (manufactured by BASF Co.), and ACMO, DMAA, DMAPAA (manufactured by Kohjin K. K.).

An oligomer or polymer such as polyurethane (meth) acrylate, polyester (meth)acrylate, and polyepoxy (meth) acrylate may be additionally blended with the resin composition of the present invention.

A photosensitizer can be additionally blended with the resin composition of the present invention.

Examples of photosensitizers include triethylamine, diethylamine, N-methyldiethanolamine, ethanolamine, 4-dimethylaminobenzoic acid, 4-dimethylaminobenzoic acid methyl, 4-dimethylaminobenzoic acid ethyl, and 4-dimethylaminobenzoic acid isoamyl. Examples of commercial products of photosensitizers include Ubecryl P102, 103, 104, 105 (manufactured by UCB Co.).

Examples of various additives, which can be added in addition to the above-described components in case of need, include antioxidants, UV absorbers, photostabilizers, silane coupling agents, surface modification agents, thermal polymerization inhibitors, leveling agents, surfactants, colorants, preservatives, plasticizers, lubricants, solvents, fillers, antiaging agents, wetting improving agents, and parting agents.

Examples of commercial products of antioxidants include Irganox 1010, 1035, 1076, 1222 (manufactured by Ciba Specialty Chemicals), Antigen P, 3C, FR, GA-80 (manufactured by Sumitomo Kagaku Kogyo K. K.).

Examples of commercial products of UV absorbers include Tinuvin P, 234, 320, 326, 327, 328, 329, 213 (manufactured by Ciba Specialty Chemicals), Seesorb 102, 103, 110, 501, 202, 712, 704 (manufactured by Shipro Kasei K. K.).

Examples of commercial products of photostabilizers include Tinuvin 292, 144, 622LD (manufactured by Ciba Specialty Chemicals), Sanol LS770 (Sankyo K. K.), Sumisorb TM-061 (Sumitomo Kagaku Kogyo K. K.).

Examples of silane coupling agents include γ-aminopropyltriethoxysilane, γ-mercaptopropyltrimethoxysilane, and γ-methacryloxypropyltrimethoxysilane. Examples of commercial products include SH6062, 6030 (manufactured by Toray Dow Corning Silicone Co.), KBE903, 603, 403 (manufactured by Shin-Etsu Kagaku Kogyo K. K.).

Examples of surface modification agents include silicone additives such as dimethylsiloxane polyether. Examples of commercial products include DC-57, DC-190 (manufactured by Dow Corning Co.), SH-28PA, SH-29PA, SH-30PA, SH190 (manufactured by Toray Dow Corning Silicone Co.), KF351, KF352, KF353, KF354 (manufactured by Shin-Etsu Kagaku Kogyo K. K.), L-700, L-7002, L-7500, FK-024-90 (manufactured by Nippon Unicar K. K.).

Examples of commercial products of parting agents include PRISURF A208F (manufactured by Daiichi Kogyo Seiyaku K. K.).

The resin composition of the present invention can be manufactured by mixing the aforementioned components by the usual method. The viscosity of the resin composition of the present invention that is thus prepared is 100-20,000 cp/25° C., preferable 300-10,000 cp/25° C., more preferably 400-5,000 cp/25° C. If the viscosity is too high, coating non-uniformity or waving occurs when the resin composition is coated on a substrate, or the patterning ability is degraded and the designed shape cannot be obtained when a core layer is formed. Conversely, if the viscosity is too low, the desired film thickness is difficult to obtain. Moreover, the patterning ability is sometimes degraded.

The cured product of the resin composition of the present invention that is obtained by curing with radiation preferably has the following properties.

When the cured product of the resin composition of the present invention is formed as a core layer of an optical waveguide, the refractive index at 25° C. and a wavelength of 824 nm is preferably 1.54 or more, more preferably 1.55 or more. If the refractive index is less than 1.54, when a waveguide is formed by using the resin composition of the present invention for the core layer, the desired transmission loss sometimes cannot be obtained.

The cured product of the resin composition of the present invention preferably has a glass transition temperature of 80° C. or higher, more preferably 90° C. or higher. If the glass transition temperature is less than 80° C., a sufficient heat resistance of the optical waveguide sometimes cannot be ensured. The "glass transition temperature" as referred to herein is defined as the temperature at which the loss tangent at an oscillation frequency of 10 Hz exhibits a maximum value in the resonance-type apparatus for measuring dynamic viscoelasticity.

EXAMPLES

The present invention will be described hereinbelow in greater detail based on experimental examples. However, the present invention is not limited to those experimental examples (Examples), and can be modified in a variety of ways within the scope defined by the claims.

Examples 1-7

Comparative Examples 1-3

Liquid curable compositions were obtained by mixing the components described in Table 1 and conducting stirring for one hour, while controlling the temperature at 50-60° C. In Table 1, the amounts of the components are described as parts by weight.

<Evaluation Methods>
1. Evaluation of Refractive Index

The refractive index at 824 nm was measured by the following method. First, a resin composition layer was formed by coating a liquid curable composition to a thickness of 7 μm on a silicon wafer substrate having a thickness of 4 inches by using a spin coater, while adjusting the rotation speed and time. Then, the resin composition layer was irradiated from a mask aligner with UV rays at 1.0 J/cm² in a nitrogen atmosphere, and a cured film was obtained. Then, the refractive index (824 nm, 25° C.) of the cured film was measured by using a prism coupler manufactured by Nippon Metricon Co.

2. Evaluation of Glass Transition Temperature

A resin composition layer was formed by coating a resin composition to a thickness of 60 μm on a glass substrate by using an applicator. Then, the resin composition layer was irradiated with UV rays at 1.0 J/cm² by using a conveyor-type UV irradiation apparatus in a nitrogen atmosphere, and a cured film was obtained. Then, the dependence of the loss tangent of the cured film on temperature was measured by using a resonance-type apparatus for measuring dynamic viscoelasticity, while applying oscillations having an oscillation frequency of 10 Hz. The glass transition temperature was defined as the temperature at which the maximum value of the loss target was obtained.

3. Evaluation of Patterning Ability

A resin composition layer was formed by coating a liquid curable composition to a thickness of 50 μm on a silicon wafer substrate having a thickness of 4 inches by using a spin coater, while adjusting the rotation speed and time. Then, the resin composition layer was irradiated from a mask aligner with UV rays at 1.0 J/cm² in an air atmosphere via a photomask having a branch-free and linear shape and having a width of 50 μm. The resin composition was then developed for 3 minutes by using acetone, and the substrate was heated for 10 minutes in an oven having a fixed temperature of 70° C.

The pattern obtained was observed under an optical microscope. The case in which the target core shape (50 μm±1 μm) was obtained was denoted by "⊚", the case in which the shape was within a range of 50 μm±2 μm was denoted by "○", and the case in which the shape was outside the range 50 μm±2 μm was denoted by "X".

4. Evaluation of Transmission Loss

ELC2500 (Clear) (manufactured by ELECTRO-LITE Corporation, $N_D^{25}$=1.515) was coated on a silicon wafer substrate having a thickness of 4 inches by using a spin coater, while adjusting the rotation speed and time. Then, the coated layer was irradiated from a mask aligner with UV rays at 1.0 J/cm² in an air atmosphere. The resin composition was then coated to a thickness of 50 μm on the substrate by using a spin coater, and the coated layer was irradiated with UV rays at 1.0 J/cm² in an air atmosphere via a photomask having a branch-free and linear shape and having a width of 50 μm. The irradiated coated layer was developed for 3 minutes by using acetone, and the substrate was heated for 10 minutes in an oven having a fixed temperature of 70° C. Then, the ELC2500 (Clear) was again coated on the substrate to a thickness of 50 μm, and the substrate was irradiated with UV rays to obtain a channel waveguide.

The end surface of the waveguide was cleaved and cut, light having a wavelength of 850 nm was introduced via a multimode fiber (diameter: 50 μm), and the waveguide loss was measured by a cut-back method. The measurement method was implemented by conducting 4-point measurements at an interval of 1 cm in a 5 cm-length portion of the waveguide. The light intensity obtained was plotted against the waveguide length, and the loss value was calculated from the inclination thereof. The case in which the loss value obtained was 0.5 dB/cm or less was denoted by "○", and the case in which it was higher than 0.5 dB/cm was denoted by "X".

The results obtained are shown in Table 1. The components presented in Table 1 are as follows.

V779: Neopol V779 (manufactured by Nippon Yupika K. K.)
  (compound name: tetrabromobisphenol A epoxy acrylate)
V779MA: Neopol V779MA (manufactured by Nippon Yupika K. K.)
  (compound name: tetrabromobisphenol A epoxy dimethacrylate)
PEA: New Frontier PHE (manufactured by Daiichi Kogyo Seiyaku K. K.)
  (compound name: phenoxyethyl acrylate)

PEMA: Light Ester PO (manufactured by Kyoeisha Kagaku K. K.)
(compound name: phenoxyethyl methacrylate)
BR-31: New Frontier BR-31 (manufactured by Daiichi Kogyo Seiyaku K. K.)
(compound name: tribromophenoxyethyl acrylate)
IRG184: Irgacure 184 (manufactured by Ciba Specialty Chemicals Co., Ltd.)
(compound name: 1-hydroxy-cyclohexyl phenyl ketone)
IRG651: Irgacure 651 (manufactured by Ciba Specialty Chemicals Co., Ltd.)
(compound name: 2,2-dimethoxy-1,2-diphenylethane-1-on)
IRG369: Irgacure 369 (manufactured by Ciba Specialty Chemicals Co., Ltd.)
(compound name: 2-benzyl-2-dimethylamino-1-(4-morpholinophenyl)-butanone-1)
IRG907: Irgacure 907 (manufactured by Ciba Specialty Chemicals Co., Ltd.)
(compound name: 2-methyl-1[4-(methylthio)phenyl]-2-morpholinopropane-1-on)
M315: Aronix M315 (manufactured by To a Gosei K. K.)
(compound name: tris(2-acryloyloxyethyl)isocyanurate)
DPHA: (manufactured by Nippon Kayaku K. K.)
(compound name: dipentaerythritol hexaacrylate)
IBXA: (manufactured by Osaka Yuki Kagaku K. K.)
(compound name: isobornyl acrylate)
IBXMA: (manufactured by Osaka Yuki Kagaku K. K.)
(compound name: isobornyl methacrylate)
ACMO: (Kohjin K. K.)
(compound name: acryloyl morpholine)
SA1002: Mitsubishi Kagaku K. K.
(compound name: tricyclodecane dimethanol diacrylate).

From Table 1, it is clear that the resin composition of the present invention (Examples 1 to 7) has excellent patterning ability when a cured product is formed, and demonstrates excellent refractive index, heat resistance, and transmission characteristic (low waveguide loss) when an optical waveguide is formed.

On the other hand, in Comparative Example 1, because component (A) is not present, heat resistance is poor. In Comparative Example 2, because component (B) is not present, patterning ability is poor. In Comparative Example 3, because components (A) and (B) are not present, patterning ability and transmission characteristic are poor.

The invention claimed is:
1. A photosensitive resin composition for optical waveguide formation, comprising:
(A) a di(meth)acrylate having the structure represented by the following general formula (1):

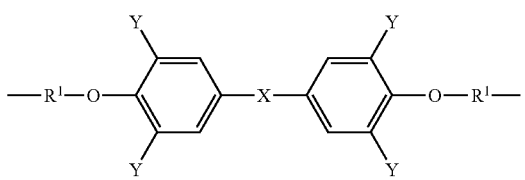

(wherein $R^1$ is $-(OCH_2CH_2)_m-$, $-OCH(CH_3)CH_2)_m-$, or $-OCH_2CH(OH)CH_2-$; X is $-C(CH_3)_2-$, $-CH_2-$, $-O-$, or $-SO_2-$; Y is a hydrogen atom or a halogen atom; m is an integer of 0 to 4;

TABLE 1

| Component | Name of commercial product | Examples | | | | | | | Comparative Examples | | |
|---|---|---|---|---|---|---|---|---|---|---|---|
| | | 1 | 2 | 3 | 4 | 5 | 6 | 7 | 1 | 2 | 3 |
| A | V779 | 23 | 30 | 18 | | 50 | 18 | 18 | 58 | | |
| | V779MA | | | | 18 | | | | | | |
| B | PEA | 10 | | | | 20 | | | 10 | | |
| | PEMA | | | 10 | 10 | | 10 | 10 | | | |
| | BR-31 | 25 | 10 | 32 | 32 | 30 | 32 | 32 | 48 | | |
| C | IRG184 | 3 | 3 | 3 | 3 | 3 | 1 | | 3 | 3 | 3 |
| | IRG651 | | | | | | | 1 | | | |
| | IRG369 | | | | | | 0.5 | | | | |
| | IRG907 | | | | | | | 0.5 | | | |
| other | M315 | 16 | 10 | 25 | 25 | | 25 | 25 | 16 | 16 | 30 |
| | DPHA | 5 | | 5 | 5 | | 5 | 5 | 5 | 5 | 10 |
| | IBXA | | | 10 | | | 10 | 10 | | | |
| | IBXMA | | | | 10 | | | | | | |
| | ACMO | 16 | 10 | | | | | | 16 | 16 | 10 |
| | SA1002 | 5 | 40 | | | | | | 5 | 5 | 50 |
| Total amount (parts by weight) | | 103 | 103 | 103 | 103 | 103 | 101.5 | 101.5 | 103 | 103 | 103 |
| Total amount of (A) and (B) in composition (wt. %) | | 56 | 39 | 58 | 58 | 97 | 59 | 59 | 56 | 56 | 0 |
| Weight ratio of (A)/(B) | | 0.66 | 3.00 | 0.43 | 0.43 | 1.00 | 0.43 | 0.43 | — | — | — |
| [Properties of liquid] Viscosity (mPa · S) | | 1000 | 1000 | 800 | 900 | 4000 | 800 | 800 | 300 | 7000 | 2000 |
| [Properties of cured body] Refractive index 824 nm | | 1.56 | 1.55 | 1.56 | 1.56 | 1.59 | 1.56 | 1.56 | 1.56 | 1.56 | 1.51 |
| Tg (° C.) | | 109 | 164 | 126 | 140 | 75 | 126 | 126 | 63 | 172 | 153 |
| Patterning ability | | ⊚ | ⊚ | ⊚ | ○ | ⊚ | ⊚ | ⊚ | ⊚ | X | X |
| Transmission characteristic | | ○ | ○ | ○ | ○ | ○ | ○ | ○ | ○ | ○ | X |

(B) a mono(meth)acrylate having the structure represented by the following formula (2):

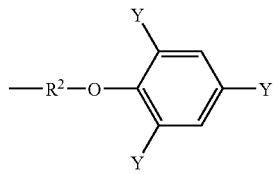
(2)

(wherein $R^2$ is —OCH$_2$CH$_2$)$_p$—, —OCH(CH$_3$)CH$_2$)$_p$—, or —OCH$_2$CH(OH)CH$_2$—; Y is a hydrogen atom, a halogen atom, Ph-C(CH$_3$)$_2$—, Ph-, or an alkyl group having 1 to 20 carbon atoms; p is an integer of 0 to 4; Ph is a phenyl group;
(C) a photoradical polymerization initiator; and tris(2-acryloyloxyethyl)isocyanurate, wherein the weight ratio (A/B) of said component (A) to said component (B) is 0.3 to 5.0.

2. The photosensitive resin composition for optical waveguide formation according to claim 1, wherein the total amount of said component (A) and said component (B) in said resin composition is 30 wt. % or higher.

3. The photosensitive resin composition for optical waveguide formation according to claim 2, wherein said total amount is 40 wt.% or higher.

4. The photosensitive resin composition for optical waveguide formation according to claim 2, wherein said total amount is 50 wt.% or higher.

5. The photosensitive resin composition for optical waveguide formation according to claim 1, wherein the amount added of said tris(2-acryloyloxyethyl) isocyanurate is 10 to 25% by weight.

6. The photosensitive resin composition for optical waveguide formation according to claim 1, wherein the refractive index of the cured product of said resin composition at 25° C. and 824 nm is 1.54 or higher.

7. The photosensitive resin composition for optical waveguide formation according to claim 6, wherein said refractive index is 1.55 or higher.

8. The photosensitive resin composition for optical waveguide formation according to claim 1, wherein the glass transition temperature (Tg) of the cured product of said resin composition is 80° C. or higher.

9. The photosensitive resin composition for optical waveguide formation according to claim 8, wherein said glass transition temperature is 90° C. or higher.

10. The photosensitive resin composition for optical waveguide formation according to claim 1, wherein component (A) comprises ethylene oxide-added bisphenol A (meth)acrylic acid ester, ethylene oxide-added tetrabromobisphenol A (meth)acrylic acid ester, bisphenol A epoxy (meth)acrylate obtained by the epoxy ring opening reaction of bisphenol A diglycidyl ether and (meth)acrylic acid, or tetrabromobisphenol A epoxy (meth)acrylate.

11. The photosensitive resin composition for optical waveguide formation according to claim 1, wherein component (B) comprises phenoxyethyl (meth)acrylate, phenoxyethoxyethyl (meth)acrylate, (meth)acrylate of p-cumyl phenol reacted with ethylene oxide, or 2,4,6-tribromophenoxyethyl (meth)acrylate.

12. The photosensitive resin composition for optical waveguide formation according to claim 1, wherein said weight ratio is 0.4 to 4.

13. The photosensitive resin composition for optical waveguide formation according to claim 1, wherein components (A) and (B) are acrylates.

14. The photosensitive resin composition for optical waveguide formation according to claim 1, wherein component (C) is present in an amount of 0.01 to 10 wt.%.

15. The photosensitive resin composition for optical waveguide formation according to claim 1, wherein component (C) is present in an amount of 0.1 to 7 wt.%.

16. The photosensitive resin composition for optical waveguide formation according to claim 1, and having a viscosity of 400-5,000 cp/25° C.

17. An optical waveguide comprising a core layer, and a clad layer formed by lamination on said core layer, wherein said core layer and/or said clad layer is composed of the cured product of the resin composition of claim 1.

18. A method for manufacturing an optical waveguide, comprising a step of irradiating the resin composition of claim 1 with radiation via a photomask and curing said resin composition.

* * * * *